(12) United States Patent
Brown

(10) Patent No.: US 8,344,200 B2
(45) Date of Patent: Jan. 1, 2013

(54) START UP PROCEDURE IN A PROCESS FOR PURIFYING AROMATIC STREAMS

(75) Inventor: Stephen H. Brown, Bernardsville, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 455 days.

(21) Appl. No.: 12/756,471

(22) Filed: Apr. 8, 2010

(65) Prior Publication Data

US 2010/0270212 A1   Oct. 28, 2010

Related U.S. Application Data

(60) Provisional application No. 61/171,553, filed on Apr. 22, 2009.

(51) Int. Cl.
*C07C 7/177* (2006.01)

(52) U.S. Cl. ......... 585/804; 585/446; 585/323; 585/805

(58) Field of Classification Search ......................... None
See application file for complete search history.

(56) References Cited

U.S. PATENT DOCUMENTS

| | | |
|---|---|---|
| 4,795,550 A | 1/1989 | Sachtler et al. |
| 5,417,844 A | 5/1995 | Boitiaux et al. |
| 6,368,496 B1 | 4/2002 | Brown et al. |
| 6,500,996 B1 | 12/2002 | Brown et al. |
| 6,781,023 B2 | 8/2004 | Brown et al. |
| 7,339,088 B1 | 3/2008 | O'Brien et al. |
| 2006/0020154 A1 | 1/2006 | Lo et al. |
| 2008/0128329 A1* | 6/2008 | Brown et al. ............... 208/300 |
| 2011/0060177 A1* | 3/2011 | Kinn et al. .................... 585/411 |

FOREIGN PATENT DOCUMENTS

EP   0 895 977   2/1999

* cited by examiner

*Primary Examiner* — Tam M Nguyen
(74) *Attorney, Agent, or Firm* — Andrew B. Griffis

(57) ABSTRACT

A process for the purification of aromatic streams is provided that includes a new start up procedure that in embodiments significantly reduces impurities in an aromatics feedstock.

7 Claims, 1 Drawing Sheet

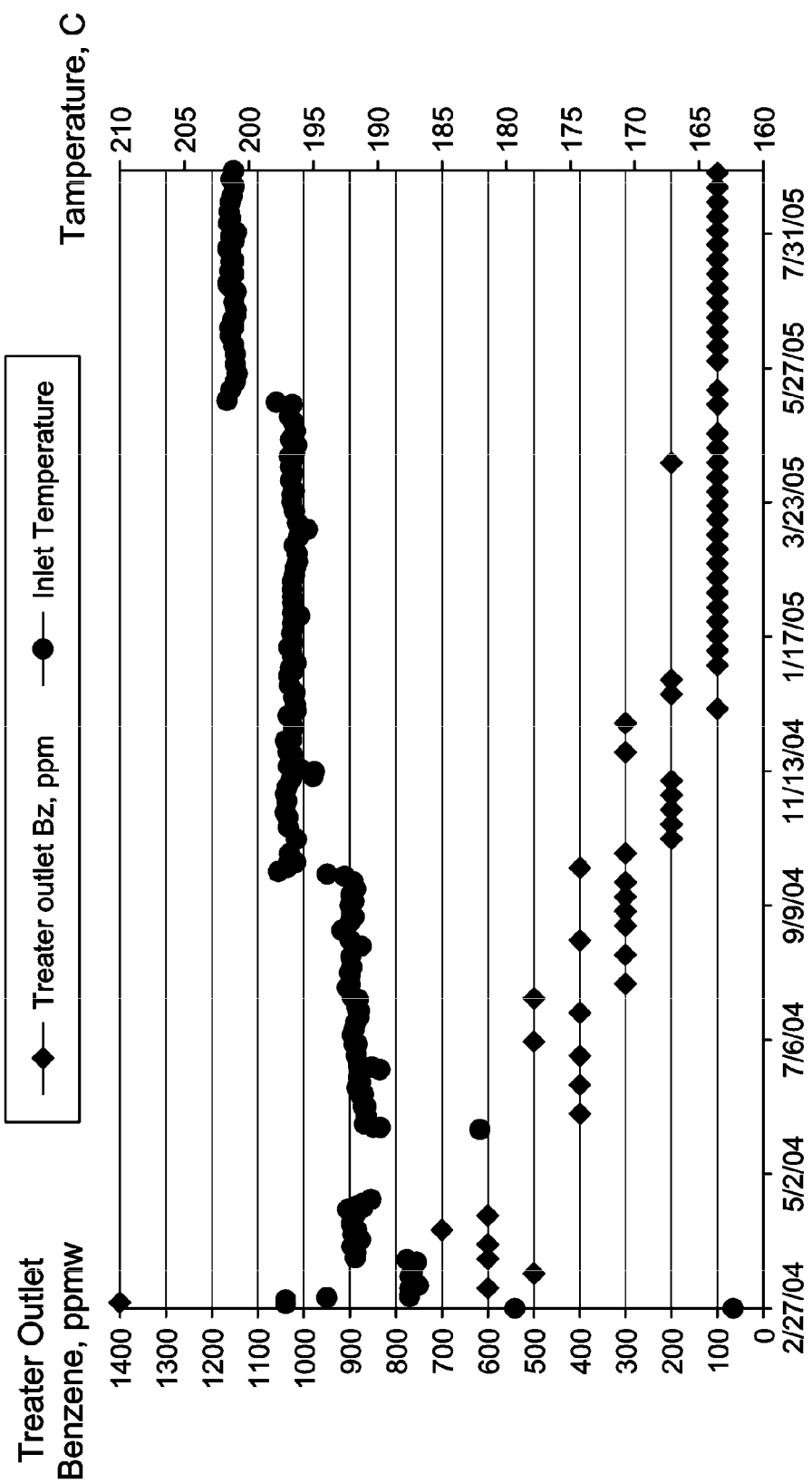

START UP PROCEDURE IN A PROCESS FOR PURIFYING AROMATIC STREAMS

CROSS REFERENCE TO RELATED APPLICATIONS

This application claims the benefit of Provisional Application No. 61/171,553 filed Apr. 22, 2009, the disclosure of which is incorporated by reference in its entirety.

FIELD OF THE INVENTION

The invention relates to purification of aromatic streams.

BACKGROUND OF THE INVENTION

In petroleum processing, aromatic streams are derived from processes such as naphtha reforming and thermal cracking (pyrolysis). These aromatic streams also contain undesirable hydrocarbon contaminants including mono-olefins, dienes, styrenes and heavy aromatic compounds such as anthracenes.

The aromatic streams are used as feedstocks in various subsequent petrochemical processes. In certain of these processes, such as para-xylene production, e.g., from an aromatic stream containing benzene, toluene and xylene (BTX) or toluene disproportionation, hydrocarbon contaminants cause undesirable side reactions. Therefore the hydrocarbon contaminants must be removed before subsequent processing of the aromatic streams.

Moreover, the shift from high-pressure semiregenerative reformers to low-pressure moving bed reformers results in a substantial increase in contaminants in the reformate derived streams. This in turn results in a greater need for more efficient and less expensive methods for removal of hydrocarbon contaminants from the aromatic streams.

Undesirable hydrocarbon contaminants containing olefinic bonds are quantified by the Bromine Index (BI). Undesirable olefins, including both dienes and mono-olefins, have typically been concurrently removed from aromatic streams such as BTX by contacting the aromatic stream with acid-treated clay. Other materials, e.g., zeolites, have also been used for this purpose. Clay is an amorphous naturally-occurring material, while zeolites used for this purpose generally are synthesized and are therefore more expensive. Both clay and zeolites have very limited lifetimes in aromatics treatment services. The length of service correlates with the level of bromine reactive impurities ("BI-reactive" impurities or contaminants) in the feedstream. BI-reactive contaminants rapidly age both clay and zeolites. Indeed, although clay is the less expensive of the two alternatives, large aromatic plants can spend more than a million dollars a year on clay. Furthermore, since zeolites are considerably more expensive than clay, their use in removing hydrocarbon contaminants can only be justified by dramatically improved stability in aromatics treatment so that their cycle length is practical.

U.S. Pat. Nos. 6,368,496 and 6,781,023 teach bromine reactive hydrocarbon contaminants are removed from aromatic streams by first providing an aromatic feedstream having a negligible diene level. The feedstream is contacted with an acid active zeolite catalyst composition under conditions sufficient to remove mono-olefins. The aromatic stream may be pretreated to remove dienes by contacting the stream with clay, hydrogenation or hydrotreating catalyst under conditions sufficient to substantially remove dienes but not mono-olefins.

Other relevant references include, U.S. Pat. Nos. 6,500,996; and 6,781,023.

Although zeolites have proven equal or superior to clay in many commercial applications, clay has at least one remaining advantage. The clay generally produces lower levels of toluene and benzene byproducts. These byproducts are produced in clay treaters containing xylenes and higher aromatics. They are believed to be produced by transalkylation reactions. The zeolite catalyst is apparently more active than clay for aromatics transalkylation at constant olefin removal levels resulting in higher levels of benzene and toluene impurities in the reactor product. There is a need for methods to improve the selectivity of zeolite catalysts.

Following standard clay start-up procedures, the zeolite catalyst is first dewatered ("dried") using available unit feedstock at the operating temperature of the parallel reactor that is on-stream, such as to a point where the water level in the effluent is <1000 ppm. Once this point (or some other desired level) is reached, the entire unit feedstock is directed to the reactor with dewatered, fresh catalyst so that the parallel reactor is ready to be brought off line and reloaded with fresh zeolite catalyst (or clay). This results in relatively high selectivity to benzene and toluene impurities.

Prior art methods of reducing such selectivity in zeolites have included reduced catalyst loading, reduced reactor temperature, and/or increased unit feed rate, however these responses are negative from an economic standpoint.

What is needed is a new startup procedure that does not require such tradeoffs.

The present inventor has discovered a new start up procedure that surprisingly improves selectivity of zeolite catalysts and in embodiments makes zeolite catalysts less active than clay for aromatics transalkylation and/or results in less benzene and toluene impurities in the reactor product.

SUMMARY OF THE INVENTION

The invention is directed to a new start up procedure for processes using zeolite catalysts to remove trace olefins from aromatics streams.

In embodiments, the catalyst is first dewatered and then fresh feedstock is flowed through the reactor at temperatures significantly below normal operating conditions, such as approximately 100° C. or less, for a predetermined period of time, such as between 0.5 to 5 days. Then the temperature of the feedstock is raised to the operating temperature.

It is an object of the invention to reduce the amount of impurities in an aromatic feedstock. It is another object of the invention to improve the performance of zeolite catalysts as replacements for clay in the purification of aromatic streams so that nothing but advantages remain in the use of such zeolites.

These and other objects, features, and advantages will become apparent as reference is made to the following detailed description, preferred embodiments, examples, and appended claims.

BRIEF DESCRIPTION OF THE DRAWINGS

FIG. 1 is a plot over time of benzene in xylene plant feedstock down stream of the olefins removal unit.

DETAILED DESCRIPTION

According to the invention, a process for the purification of aromatic streams is provided that includes a new start up procedure that in embodiments significantly reduces impurities in an aromatics feedstock.

The process will be described with particular emphasis on feeds, pretreatment, catalysts, process conditions, and regeneration. One of ordinary skill in the art will recognize that there are numerous variations possible within the scope of the appended claims.

Feeds

Aromatic streams can be obtained from reforming and cracking processes. The streams include, e.g., mononuclear aromatic hydrocarbons and undesirable olefins including styrenes, and the streams have an initial Bromine Index (BI) from about 100 to about 3000. The Bromine Index is an indicator of the presence of olefinic bonds. Bromine Index is determined according to ASTM D 2710-92 and is a measure of milligrams of bromine consumed by 100 grams of sample under given conditions.

The aromatics include, for example, benzene, toluene, xylene, ethyl benzene, cumene and other aromatics derived, e.g., from reformate. Reformate is separated by distillation into light reformate which is mostly benzene and toluene, and heavy reformate which includes toluene, ortho-, meta- and para-xylenes and other heavier aromatics including C9+. Some aromatic streams such as heavy reformate derived from semi-regen processes contain negligible levels of dienes as they emerge from the processing. By negligible is meant that the level is below 50 ppm, essentially diene-free or too low to be quantified. Other aromatic streams such as light reformate derived from semi-regen reformers and light and heavy reformate from CCR's (continuous catalyst regeneration) processes include detectable levels of dienes, e.g., over 50 ppm, as they emerge from the processes.

The aromatic streams to be treated according to the invention contain bromine-reactive hydrocarbon compounds in levels which interfere in subsequent aromatics processing. An objectionable level of olefinic contaminants is from about 0.05 to about 1.5 weight percent or a BI from about 100 to about 3000.

According to embodiments of the invention, use of a regenerated catalyst improves the removal of olefinic contaminants in the aromatic streams so that said contaminants do not interfere in subsequent aromatics processing.

Pre-Treatment

An aromatic hydrocarbon stream to be treated to remove mono-olefins according to the invention is essentially diene-free, i.e., has a negligible level of dienes. If the aromatic stream contains dienes above these levels, the stream can be pre-treated according to the invention to remove the dienes. Dienes are more selective for catalyst deactivating coke formation than mono-olefins. Therefore, these highly reactive diene species are substantially removed over a first catalyst. One of ordinary skill in the art in possession of the present disclosure can determine the appropriate level of dienes present without more than routine experimentation. In embodiments, the amount of dienes will be less than 1000 ppm and a feed such as reformate having less than 1000 ppm dienes is preferred. Another preferred feed is one having less than 10,000 ppm total olefins, including styrenes and dienes, wherein the dienes are present in the amount of no more than 10 wt % of the total BI. Feeds having less than 1000 ppm or less than 500 ppm or less than 300 ppm or less than 100 ppm dienes are also preferred. There is no particular minimum amount of dienes that needs to be specified, however in embodiments it will be specified that dienes are present, or that dienes are present in the amount of at least 1 ppm, or 10 ppm, or 100 ppm.

The pre-treating step is conducted at temperatures preferably of about 50 or 100° F. (10° C. and 38° C., respectively), to about 500° F. (260° C.) or 600° F. (316° C.), more preferably about 150° F. (65° C.) to about 450° F. (232° C.). A weight hourly space velocity (WHSV) is preferably from about 0.1 to about 10 and the pressure is preferably about 50 psig to about 500 psig. The pre-treating is carried out in the absence of added hydrogen. Preferred catalysts for the pre-treatment step include acid treated clay such as bentonite or traditional base metal-containing hydrogenation or hydrotreating catalysts such as $NiMo/Al_2O_3$, $CoMo/Al_2O_3$, $Ni/Al_2O_3$ and $Ni/SiO_2$.

The pre-treated aromatic feed is then treated over a second catalyst to substantially remove the mono-olefins.

Catalysts

The catalysts for selectively removing mono-olefin compounds include, e.g., large pore zeolites, particularly MCM-22 type materials, mesoporous materials including those termed M41 S, SAPO's, pillared and/or layered materials.

Zeolites are divided into three major groups according to their pore/channel systems. These systems include 8-membered oxygen ring systems, 10-membered oxygen ring systems, 12-membered oxygen ring systems, and the dual pore systems including 10 and 12-membered oxygen ring openings. In general, they are referred to as small, medium or large pore size zeolites proceeding from 8 to 12 membered systems. These systems are more completely described in Atlas of Zeolite Structure Types, International Zeolite Assoc., Polycrystal Book Service, Plattsburg, 1978.

The chemical composition of zeolites can vary widely and they typically consist of $SiO_2$ in which some of the silicon atoms may be replaced by tetravalent ions such as Ti or Ge, or by trivalent ions such as Al, B, Ga, Fe, or by bivalent ions such as Be, or by other members of Group III of the Periodic table of the Elements or by a combination of the aforementioned ions. When there is substitution by bivalent or trivalent ions, cations such as Na+, $Ca^{++}$, $NH_4^+$ or H+ are present in the as-synthesized zeolite, also organic ions such as tetramethylamine ($TMA^+$), tetraethylamine ($TEA^+$) and others. The organics are typically removed by calcination prior to use of the zeolite. Ion exchange of residual cations with, for example, $NH_4^+$, is generally followed by calcination to produce the acidic zeolite.

Preferred catalysts include natural or synthetic crystalline molecular sieves, with ring structures of ten to twelve members or greater. Crystalline molecular sieves useful as catalysts include as non-limiting examples, large pore zeolites ZSM-4 (omega) (U.S. Pat. No. 3,923,639), mordenite, ZSM-18 (U.S. Pat. No. 3,950,496), ZSM-20 (U.S. Pat. No. 3,972,983), zeolite Beta (U.S. Pat. Nos. 3,308,069 and Re 28,341), Faujasite X (U.S. Pat. No. 2,882,244), Faujasite Y (U.S. Pat. No. 3,130,007), USY (U.S. Pat. Nos. 3,293,192 and 3,449,070), REY and other 15 forms of X and Y, MCM-22 (U.S. Pat. No. 4,954,325), MCM-36 (U.S. Pat. No. 5,229,341), MCM-49 (U.S. Pat. No. 5,236,575), MCM-56 (U.S. Pat. No. 5,362,697) and mesoporous materials such as M41S (U.S. Pat. No. 5,102,643) and MCM-41 (U.S. Pat. No. 5,098,684). More preferred molecular sieves include 12 membered oxygen-ring structures ZSM-12, mordenite, Zeolite Beta, USY, and the mixed 10-12 membered oxygen ring structures from the MCM-22 family, layered materials and mesoporous materials. Most preferred are the MCM-22 family of molecular sieves. This family, i.e., MCM-22 type materials, includes, e.g., MCM-22, MCM-36, MCM-49 and MCM-56. The MCM-22 type materials may be considered to contain a similar common layered structure unit. The structure unit is described, e.g., in U.S. Pat. Nos. 5,371,310, 5,453,554, 5,493,065 and 5,557,024.

One measure of acid activity may be termed the Alpha Value. The Alpha Value is an approximate indication of the catalyst acid activity and it gives the relative rate constant (rate of normal hexane conversion per volume of catalyst per unit time). It is based on the activity of the highly active silica-alumina cracking catalyst taken as an Alpha of 1 (Rate Constant=0.16 sect$^{-1}$). The alpha test is described in U.S. Pat. No. 3,354,078, in the Journal of Catalysis, Vol. 4, p. 527 (1965); Vol. 6, p. 278, and Vol. 61, p. 395 (1980), each incorporated by reference as to that description. The experimental conditions of the test used herein include a constant temperature of 538° C. and a variable flow rate as described in the Journal of Catalysis, Vol. 61, p. 395 (1980). In embodiments, the catalysts of the invention have an alpha value from about 100 to about 1000.

The crystalline molecular sieve may be used in bound form, i.e., composited with a matrix material, including synthetic and naturally occurring substances, e.g., clay, silica, alumina, zirconia, titania, silica-alumina and other metal oxides. Naturally-occurring clays include those of the montmorillonite and kaolin families. The matrix itself may possess catalytic properties, often of an acid nature. Other porous matrix materials include silica-magnesia, silica-zirconia, silica-thoria, silica-beryllia, silica-titania, as well as ternary compositions such as silica-alumina-thoria, silica-alumina-zirconia, silica-alumina-magnesia, and silica-alumina-zirconia. A mixture of these components can also be used. The relative proportions of crystalline molecular sieve material and matrix may vary widely from 1 to 90 weight percent, usually about 20 to about 80 weight percent. The catalyst can also be used in the absence of matrix or binder, i.e., in self-bound form. The catalyst can be used in the form of an extrudate, lobed form (e.g., trilobe), spheres, spray-dried microspheres, or powder.

Process Conditions

In general, the method for the removal of mono-olefins is carried out under conditions including a moderately elevated temperature preferably ranging from about 200 or 250° F. (93 or 121° C.) to about 600° F. (316° C.), more preferably from about 250° F. (121° C.) to about 500° F. (260° C.); a space velocity preferably ranging from about 0.1 WHSV to about 100 WHSV, more preferably from about 0.3 WHSV to about 30 WHSV; and a pressure ranging from about 50 psig to about 1000 psig, more preferably about 100 psig to about 500 psig.

Start Up Conditions

Previous to the present invention one specific start up procedure involves flowing recycled feed at reaction temperature (typically between 160 and 200° C.) across the catalyst at a low flow rate (typically 0.05 to 0.5 LHSV) in order to remove water from the catalyst system. Water is stripped from the product and then the dry product is recycled to the reactor. This procedure is known as a dry out and is typically conducted to prevent corrosion in downstream equipment. When water in the reactor effluent reaches a specified level (typically <100 to 1000 ppm), the feedrate to the reactor is increased to standard operating conditions (typically 0.3 to 3 LHSV) while maintaining reaction temperature. In addition to completing the desired removal of olefins, the dewatered catalyst also produces unwanted benzene and toluene byproducts. These byproducts result in operational constraints, because benzene and toluene in the product cannot exceed specifications set to meet the needs of downstream process equipment.

The new start-up procedure provides a simple and practical method of improving the selectivity of the catalyst. Once the catalyst is dewatered, fresh unit feedstock is flowed through the reactor at <100° C. for between 0.5 and 5 days. Then the feedstock temperature is raised to the operating temperature. Significantly lower levels of benzene and toluene are observed.

The following non-limiting examples illustrate the invention:

Comparative Example 1

A combination of fresh and recycled xylenes plant feedstock was flowed at 0.1 LHSV and 180° C. across a commercial catalyst system in order to remove water from the catalyst system. The feedstock was produced by distilling the liquid product obtained from a refinery CCR to obtain a C8+ heavy reformate. The feedstock had a BI ranging from 750 to 1500 and contained <10 ppm benzene, <5000 ppm toluene, and >50 wt % C8 aromatics. Water was stripped from the product. After 3 days on stream the water in the reactor effluent dropped below 1000 ppm. The main feedstock flow was then switched to the newly dried reactor. The feedstock passed through both reactors in series for 7 days, and passed through the older reactor first. Then the older reactor was taken off-line. The fresh, dry commercial catalyst was now operating at 1.2 LHSV and 187° C. The reactor effluent was monitored for benzene as the run progressed. The data is shown in FIG. 1. Eight months were required to reduce benzene levels to below 200 ppm. Typical levels for clay catalyst are <50 ppm after 5 days on stream.

Example 2

The same commercial catalyst system in the same reactor with the same feedstock as Example 1 was used. The same dry-out procedure is used. After drying out the catalyst, the main feedstock to the unit is flowed across the fresh, dry reactor at 1.2 LHSV and 50° C. This is accomplished by using feedstock from the xylenes plant feed storage tank and bypassing the unit heat exchanger. The feedstock flows in series through both reactors at these conditions. The feedstock first flows through the fresh, dried reactor and second through the nearly spent reactor. The conditions are maintained for 3 days. The feedstock is then switched to normal hot feedstock which passes through the unit feedstock heat exchanger. The temperature is 187° C., the same as in Example 1. The reactor effluent is monitored for benzene just like Example 1. The benzene level in the reactor effluent is <200 ppm from the start of the run.

It is believed that the low temperature treatment deposits hydrocarbons on the catalyst, reducing the activity of the catalyst for benzene formation at the start of run. The inventors believe that the optimum time and temperature for catalyst pretreatment will be different for every clay treater depending upon the composition of the feedstock and the operating conditions of the unit. Those skilled in the art will vary the time and temperature of the pretreatment conditions of the invention in order to minimize benzene byproduct.

FIG. 1 plots monitoring data for the commercial catalyst system used in comparative example 1. The reactor was brought on line in February. The product from the xylenes plant feedstock treater was sampled regularly and analyzed for benzene content. The temperature of the reactor containing the catalyst system was continuously monitored. FIG. 1 plots the evolution of ppm levels of benzene in the reactor product and the reactor temperature as the run progressed from February to the end of July. Benzene levels in the reactor product were initially above 1000 ppm. Benzene levels dropped steadily with time from start-up in February until the end of December when they reached a steady-state value between 50 and 100 ppm.

Trade names used herein are indicated by a ™ symbol or ® symbol, indicating that the names may be protected by certain trademark rights, e.g., they may be registered trademarks in various jurisdictions. All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

The invention has been described above with reference to numerous embodiments and specific examples. Many variations will suggest themselves to those skilled in this art in light of the above detailed description. All such obvious variations are within the full intended scope of the appended claims. Never the less, most preferably embodiments include the following: in a method of pretreating a zeolite catalyst used to purify aromatic feeds at operating conditions including an operating feed temperature, the improvement comprising dewatering said catalyst and then flowing feed over said catalyst at a temperature below 100° C. for at least 0.5 days, preferably between 0.5 and 5 days, and then raising feed temperature to said preselected operating conditions; particularly wherein said dewatering is carried out by flowing feed over said catalyst at a temperature of at least 100° C. until the water in the reactor effluent drops below 1000 ppm, preferably 100 ppm; and also either of these embodiments wherein said zeolite catalyst is defined as comprising a catalyst selected from the MCM-22 family of molecular sieves, or wherein said zeolite catalyst comprises MCM-49, or wherein said zeolite catalyst comprises MCM-56, or wherein said zeolite catalyst comprises Beta; and of the aforementioned embodiments, further modified by the limitation that said flowing feed rate is from 0.3 to 3 LHSV; and also a more preferable embodiment defined as a method for removing bromine-reactive contaminants from an aromatic hydrocarbon feedstream which comprises: (a) providing an aromatic hydrocarbon feedstream which has a negligible diene level; and (b) contacting the feedstream with an acid active catalyst composition under conditions sufficient to at least partially remove bromine-reactive contaminants to provide a treated aromatic hydrocarbon feedstream; wherein said acid active catalyst is treated before step (b) by a step of dewatering and then a step of flowing said feedstream in step (a) over said dewatered catalyst for a period of at least 0.5 days, and preferably from about 0.5 to 5 days; which may be yet still further defined by the limitation that said step of dewatering comprises flowing said feedstream in step (a) over said catalyst at a temperature of at least 100° C. until the water in the reactor effluent drops below 1000 ppm, preferably 100 ppm.

What is claimed is:

1. A method for removing bromine-reactive contaminants from an aromatic hydrocarbon feedstream which comprises:
    (a) providing an aromatic hydrocarbon feedstream which has a total olefins content of less than 10,000 ppm and dienes in the amount of less than 1000 ppm; and
    (b) contacting the feedstream with an acid active catalyst composition in a reactor under conditions sufficient to at least partially remove bromine-reactive contaminants to provide a reactor effluent comprising treated aromatic hydrocarbon feedstream;
    wherein said acid active catalyst is treated before step (b) by a step of dewatering and then a step of flowing said feedstream in step (a) over said dewatered catalyst for a period of at least 0.5 days, and further wherein said step of dewatering comprises flowing said feedstream in step (a) over said catalyst at a temperature of at least 100° C. until the water in said reactor effluent drops below 1000 ppm.

2. The method of claim 1, wherein said step of flowing said feedstream in step (a) over said dewatered catalyst is for a period of from 0.5 to 5 days, and wherein said step of dewatering comprises flowing said feedstream in step (a) over said catalyst at a temperature of at least 100° C. until the water in the reactor effluent drops below 100 ppm.

3. The method of claim 1, wherein said acid active catalyst comprises a catalyst selected from the MCM-22 family of molecular sieves.

4. The method of claim 1, wherein said acid active catalyst comprises MCM-49.

5. The method of claim 1, wherein said acid active catalyst comprises MCM-56.

6. The method of claim 1, wherein said acid active catalyst comprises Beta.

7. The method of claim 1, wherein said step of flowing said feedstream is at a rate of from 0.3 to 3 LHSV.

* * * * *